United States Patent
Kyllingstad

(10) Patent No.: US 8,541,968 B2
(45) Date of Patent: Sep. 24, 2013

(54) METHOD FOR REDUCING COGGING TORQUE EFFECTS OF AN ELECTRICAL PERMANENT MAGNET MACHINE

(75) Inventor: Åge Kyllingstad, Ålgård (NO)

(73) Assignee: National Oilwell Varco Norway AS, Stavanger (NO)

(*) Notice: Subject to any disclaimer, the term of this patent is extended or adjusted under 35 U.S.C. 154(b) by 455 days.

(21) Appl. No.: 12/934,182

(22) PCT Filed: Mar. 16, 2009

(86) PCT No.: PCT/NO2009/000096
§ 371 (c)(1),
(2), (4) Date: Dec. 10, 2010

(87) PCT Pub. No.: WO2009/120086
PCT Pub. Date: Oct. 1, 2009

(65) Prior Publication Data
US 2011/0084636 A1    Apr. 14, 2011

(30) Foreign Application Priority Data
Mar. 26, 2008    (NO) .................................. 20081474

(51) Int. Cl.
*H02P 6/10* (2006.01)
*H02P 6/20* (2006.01)

(52) U.S. Cl.
USPC .................................... 318/400.23; 318/431

(58) Field of Classification Search
USPC .................. 318/400.11, 400.23, 430, 431
See application file for complete search history.

(56) References Cited

U.S. PATENT DOCUMENTS

| | | | |
|---|---|---|---|
| 7,117,754 B2 * | 10/2006 | Neely et al. | 73/862.333 |
| 7,885,785 B1 * | 2/2011 | Pekarek et al. | 702/151 |
| 2003/0071530 A1 | 4/2003 | Takahashi | |
| 2008/0315810 A1 | 3/2008 | Sakamoto et al. | |

FOREIGN PATENT DOCUMENTS

| | | |
|---|---|---|
| EP | 1306963 A1 | 5/2003 |
| JP | 2004056839 A | 2/2004 |
| JP | 2008000503 A | 1/2008 |
| NO | 20071989 | 10/2007 |
| WO | 2007099629 A1 | 9/2007 |
| WO | 2008089536 | 7/2008 |

OTHER PUBLICATIONS

Response to Written Opinion dated Jun. 10, 2009 for International Application No. PCT/NO2009/000096, 30 pages.

* cited by examiner

*Primary Examiner* — Bentsu Ro
(74) *Attorney, Agent, or Firm* — Conley Rose, P.C.

(57) ABSTRACT

A method for reducing cogging torque effects of an electrical permanent magnet machine includes running an "a" test and a "b" test with different cogging compensation signals. A first value is calculated by multiplying a complex cogging amplitude of the compensation signal applied for the "a" test with a complex amplitude of a vibration signal resulting from cogging torque of the "b" test. A second value is calculated by multiplying a complex cogging amplitude of the compensation signal applied for the "b" test with a complex amplitude of the vibration signal resulting from cogging torque of the "a" test. A desired complex cogging compensation amplitude is calculated by dividing the difference between the first and second values by a difference between the complex amplitudes of the vibration signals resulting from the "b" test and the "a" test. A cogging compensation torque is applied to the machine based on the desired complex cogging compensation amplitude.

17 Claims, 2 Drawing Sheets

METHOD FOR REDUCING COGGING TORQUE EFFECTS OF AN ELECTRICAL PERMANENT MAGNET MACHINE

CROSS-REFERENCE TO RELATED APPLICATION

The present application is the U.S. National Stage under 35 U.S.C. §371 of PCT/NO2009/000096, filed Mar. 16, 2009, the disclosure of which is hereby incorporated herein by reference.

FIELD OF INVENTION

There is provided a method for reducing cogging torque effects of an electrical permanent magnet machine. More precisely, the method relates to reducing cogging torque effects of an electrical permanent magnet machine where the machine is connected to a controlling electronics, hereafter called drive, controlling torque and speed of the machine, and where the drive includes the feature of adding a torque component independent of the torque generated by the part of the drive that regulates the speed.

BACKGROUND

So called cogging is a well known feature of Permanent Magnet (PM) machines and exhibits themselves by varying machine speed and/or torque. Cogging torque is due to interaction between the permanent magnets of the rotor and the slots of the stator of PM-machine and the rotor is attracted to positions where the magnetic flux across the airgap is at a maximum. With the exception of step motors, cogging torque is undesirable because it leads to the speed variations and also to vibrations of the stator foundations, especially at low to moderate motor speeds. Most PM machines are therefore designed to minimize the cogging torque, usually through using skewed magnets or stator slots.

Despite efforts to minimize cogging torque through proper electrical and mechanical design it is quite common that PM machines have residual cogging torque amplitudes of 0.5-2% of the nominal torque. Even machines which are virtually identical, can have relative large individual differences in the cogging torque characteristics.

JP 2008000503 discloses a method for reducing torque ripples and cogging torque by adding a corrective torque to a motor. A switching means are provided for switching between addition and non-addition of the vibration control amount according to the mode of operation.

US 2008/0315810 discloses a method for reducing cogging torque where the values of corrective torque is stored in a memory. The value of the corrective torque is selected according to the operational conditions of the motor.

Modern permanent magnet machines are often controlled by variable frequency drives widely used for controlling electrical induction motors. Some of these drives also have built-in software aiming at compensating for the cogging torque. The software simply adds harmonic torque components with specified harmonic numbers, amplitudes and phases to the speed corrective torque coming from the speed controller. This compensation software has proved to work fine for a specific load and speed, but experience has shown that it fails when the speed and/or the load differ much from the tuning conditions. The reason for this is that the optimal or desired compensation signal varies much with speed and load of the motor, and the static approach with constant amplitudes and phases is not capable of adapting to new conditions.

SUMMARY

The object of the present invention is to overcome or at least partly remedy the draw backs of the prior art PM machine.

The object is achieved in accordance with the invention, by the features indicated in the description below and in the following claims outlining a method for adaptive cogging compensation.

There is provided a method for reducing cogging torque effects of an electrical permanent magnet machine, where the machine is connected to a drive, and where the drive includes the feature of adding a torque component independent of a torque generated by a speed regulator, the machine having a rotor and a stator, and where the method includes:

measuring the angular position of the rotor relative to the stator and the angular speed of the rotor by use of a sensor;

running at least two tests with at least two different cogging compensation signals from the drive where one of the tests is designated an "a" test and another test is designated a "b" test;

analyse the received signal from the sensor to find the corresponding amplitude and phase responses of the vibration signal for said tests, wherein the method further includes:

calculate a first value by multiplying the complex cogging amplitude of the applied compensation signal for the a test with the complex amplitude of the vibration signal representing vibrations resulting from the cogging torque of the b test;

calculate a second value by multiplying the complex cogging amplitude of the applied compensation signal for the b test with the complex amplitude of the vibration signal representing vibrations resulting from the cogging torque of the a test;

calculate the complex cogging compensation amplitude by dividing the difference between said first value and said second value by the difference between the complex amplitudes of the vibration signals representing vibrations resulting from the b test and the a test, as set out in equation 11 or 11 a below;

apply a cogging compensation torque to the machine based on the complex cogging compensation amplitude.

It is an aspect of the method that the method includes:

measuring at least one of the quantities: angular speed or angular acceleration of the rotor, the stator or the difference between the two, by the use of a vibration sensor attached to the machine or its foundation.

It is an aspect of the method that the method includes:

running the active tests with two different compensation signals where one or more harmonics of the fundamental cogging frequency are added to the set torque from the speed regulator;

It is another aspect of the method that the method includes:

applying a position or time based Fourier analysis of the raw or processed speed signal in order to find the corresponding amplitude and phase responses of the speed for said tests.

It is yet another aspect of the method that the processed speed signal is corrected for anharmonic variations through calculating partial averages of speed and angle over intervals representing integer number of the cogging period fit a polynomial function to the said averages, subtract the fitted function from the raw speed signal rendering a dynamic speed signal more suitable for Fourier analysis.

The drive includes at least one speed controller and one torque controller.

BRIEF DESCRIPTION OF THE DRAWINGS

In the following there is described an example of use of the method illustrated in the accompanying drawings, in which.

DETAILED DESCRIPTION

Figure 1:
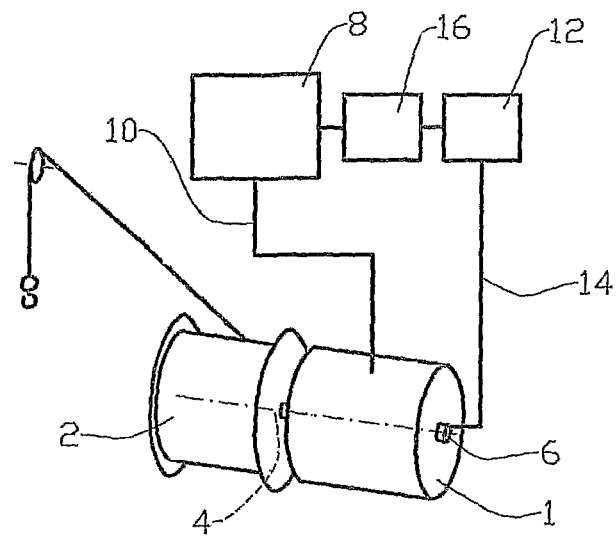
FIG. 1 schematically shows a permanent magnet motor driving a crane wire spool.

Below, the term motor is used for convenience, although the analysis applies also to a variety of electrical machines that can act also as generators.

The following notation is utilized below:

| | |
|---|---|
| C | cogging compensation torque |
| $C_a$ and $C_b$: | cogging compensation amplitudes |
| $\overline{C}_{o,k}$ | averaged compensation amplitude after k tuning tests |
| $C_h$ | complex cogging compensation amplitude of harmonic h |
| $C_o$ | compensation amplitude |
| $H_T$ | complex transfer function of the torque controller |
| N | encoder counts per revolution |
| P and I: | speed controller parameters |
| $J_r$ | rotor inertia |
| $J_s$ | stator inertia |
| $T_m$ | motor torque from drive |
| $T_c$ | cogging torque |
| $T_{re}$ | torque from the external rotor load |
| $Z_r$ | mechanical impedance of rotor |
| $Z_{re}$ | external rotor impedance |
| $Z_s$ | mechanical impedance of stator |
| $Z_{se}$ | external stator impedance |
| $Z_\Omega$ | complex impedance of the speed controller |
| $\theta$ | encoder based mechanical angular position of the rotor |
| $\theta_0$ | possible offset angle |
| $\Delta\theta_n$ | angle increment |
| $\Omega$ | measured speed |
| $\Omega_a$ | complex speed amplitude from test a |
| $\Omega_b$ | complex speed amplitude from test b |
| $\Omega_r$ | angular rotor speed |
| $\Omega_s$ | angular stator speed |
| $\Omega_{set}$ | demanded speed |
| $\Omega_1$ | speed amplitude for 1st harmonic |
| $\overline{\Omega}$ | mean rotational speed |
| {h} | cogging harmonics |
| i | imaginary unit |
| k | number of tuning tests |
| m | number of cogging periods |
| n | actual counter value |
| $n_p$ | number of pole pairs of a motor |
| $n_s$ | number of slots in the stator |
| s | Laplace variable |
| $\epsilon_h$ | residual compensation error |
| $\omega$ | angular frequency |
| v | vibration signal representing variations resulting from the cogging torque |
| $\Delta t_n$ | time increments |

To understand the effect of cogging torque, it is useful to study the equation of motion for the rotor. It may be written as $$J_r \frac{d\Omega_r}{dt} = T_m - T_c - T_{re} \quad (1)$$

where $J_r$ is the rotor inertia, $\Omega_r$ is the angular rotor speed, $T_m$ is the motor torque from the drive, $T_c$ is the cogging torque and $T_{re}$ is the torque from the external rotor load. The motor torque is determined by a speed controller and a torque controller, and is often based on the demanded speed set by the operator.

As an example, if the speed controller is a standard PI-controller, the current controller is perfect with unity gain, and the time delays are negligible, then the motor torque without cogging compensation can be written as $$T_m = P \cdot (\Omega_{set} - \Omega) + I \int (\Omega_{set} - \Omega) dt \quad (2)$$

Here P and I are speed controller parameters, $\Omega$ is the measured speed and $\Omega_{set}$ is the demanded speed set by the operator. The measured speed is normally derived from an encoder measuring the angular position of the rotor relative to the stator.

As long as the stator is not infinitely stiff, the stator vibrations and their influence on the measured speed cannot be ignored. This is a least true for frequencies representing structural resonances in the stator and its support.

When studying periodic variations of the speed and torque it is convenient to use the Laplace transformation. Time differentiation is then substituted by the Laplace variable s, while integration is substituted by 1/s. For steady state conditions the Laplace variable represents the angular frequency times the imaginary unit, that is s=iω. In the following complex amplitudes, described either by their real and imaginary parts or by their magnitudes and phases, will be termed amplitudes, for convenience.

The following simplifying assumptions are used:

The set speed is constant with no harmonic variations.

The speed controller generates a harmonic torque represented by its amplitude C.

The measured speed represents the angular speed difference between rotor and stator, that is $\Omega = \Omega_r - \Omega_s$.

The speed controller is linear and can be represented by the complex impedance $Z_\Omega$.

The torque controller is linear and can therefore be represented by the complex transfer function $H_T$. This assumption is valid locally for small variations of speed and load even when torque regulator is non-linear over a wider scale.

The external torque component acting on the rotor varies linearly with the rotor speed.

Under these assumptions the Laplace transformed equation of motion for the rotor can be written as $$sJ_r\Omega_r = -H_T Z_\Omega(\Omega_r - \Omega_s) + H_T C - Z_{re}\Omega_r - T_c \quad (3)$$

Here $Z_{re}$ is the external rotor impedance so that the product $-Z_{re}\Omega_r$ represents the dynamic external load resulting from the speed variation of the rotor. For convenience, the same symbols are used for the Laplace transformed speeds and cogging torque as the corresponding time variables in equation (1).

In accordance with Newton's 3$^{rd}$ law the motor torque and the cogging torque are also acting on the stator but in the opposite direction. The equation of motion for the stator is therefore $$sJ_s\Omega_s = H_T Z_\Omega(\Omega_r - \Omega_s) - H_T C - Z_{se}\Omega_r + T_c \quad (4)$$

Here $Z_{se}$ is the external stator impedance so that the product $-Z_{se}\Omega_s$ represents the reaction force action on the stator by the stator foundation.

Adding equations (3) and (4) leads to the following expression $$(sJ_r + Z_{re})\Omega_r = -(sJ_s + Z_{se})\Omega_s \quad (5)$$

It is convenient to introduce the following abbreviations $Z_r = sJ_r + Z_{re}$ and $Z_s = sJ_s + Z_{se}$. In contrast to the last terms these impedances also include the inertia effects. Hence, the left hand side of the above equation represents the dynamic force acting in the rotor due to its own speed variation.

Realizing that $\Omega_s = \Omega_r - \Omega$ the equation above can be rewritten as $$\Omega_r = \frac{Z_s}{Z_r + Z_s}\Omega \quad (6)$$

Combining this expression by equation (3) and introducing the combined impedance $Z = Z_r Z_s/(Z_r + Z_s)$ lead to $$(H_T Z_\Omega + Z)\Omega = H_T C - T_c \quad (7)$$

The goal is to find the compensation amplitude $C_o = T_c/H_T$ that makes the dynamic speed variations vanish. It should be realized that the cogging torque amplitude $T_c$, the impedances $Z_\Omega$, $Z_r$, $Z_s$ and the torque controller transfer function $H_T$ are unknown complex functions that vary with speed and torque load of the motor. It is however possible to find the compensation amplitude without knowing these parameters. The method to do that is described in the following. It is fortunate that this also seems to be the optimal or the desired cogging compensation.

Assume that two different cogging compensation amplitudes, represented by $C_a$ and $C_b$, are applied in two tests having same mean speed and load. The different amplitudes generate different responses represented by the measurable speed amplitudes $\Omega_a$ and $\Omega_b$. Including also the desired cogging compensation amplitude giving zero speed amplitude, the following three equations apply.

$$(H_T Z_\Omega + Z)\Omega_a = H_T C_a - T_c \quad (8)$$

$$(H_T Z_\Omega + Z)\Omega_b = H_T C_b - T_c \quad (9)$$

$$0 = H_T C_o - T_c \quad (10)$$

It can be seen, by inserting $T_c = H_T C_o$ into the two first equations and then divide equation (8) by equation (9) that the desired cogging compensation can be written as $$C_o = \frac{C_a \Omega_b - C_b \Omega_a}{\Omega_b - \Omega_a} \quad (11)$$

This formula shows that it is possible to determine the desired cogging compensation amplitude empirically from two tests without knowing neither the cogging torque itself nor the system parameters describing the dynamics of the motors and its interaction with the structure.

It is worth mentioning that the choice of using speed variations amplitudes to represent the cogging torque response is for convenience. Since the encoder signal is required for knowing the relative rotor position, it is straightforward to find the angular speed without having another sensor.

The formula (11) applies equally well if we substitute the angular speed amplitude by the angular acceleration $\alpha = \Omega/s$. Alternatively, a standard accelerometer measuring the linear acceleration at the stator or at the stator foundation could be used as a vibration sensor. Equation (11) may therefore be generalized to $$C_o = \frac{C_a v_b - C_b v_a}{v_b - v_a} \quad (11b)$$

where v represents any vibration signal representing variations resulting from the cogging torque.

The disadvantages of using accelerometers instead of encoder based speed are a) the need for an extra vibration sensor, b) accelerometers can more easily pick up vibrations from external sources and c) the signal to noise ratio for acceleration signal will be very poor for low speeds or frequencies.

So far the equations are derived for one frequency or harmonics only, representing typically the base cogging frequency. However, the method may be generalized to include a plurality of cogging harmonics. Because of the basic assumption of linearity, the complex amplitudes for the various harmonics can be found from the same tests, provided that the amplitudes for each harmonic are different for the two tuning tests.

In the theory for electrical machines it is distinguished between mechanical and electrical angles and angular speed. For a synchronous machine with $n_p$ pole pairs the instant electric angle (also called transformation angle) and the angular frequency is given by $$\theta_e = n_p \theta \quad (12)$$

$$\omega_e = n_p \frac{d\theta}{dt} = n_p \Omega \quad (13)$$

Here $\theta$ is the encoder based mechanical angular position of the rotor. If the motor has $n_s$ slots, the fundamental angular cogging frequency is $$\omega_c = n_s \Omega = \frac{n_s}{n_p}\omega_e \quad (14)$$

An encoder is actually a discrete measure of the mechanical rotor angle. If the encoder has N counts per revolution and the actual counter value is n the measured mechanical angle is $$\theta_n = \frac{2\pi n}{N} + \theta_0 \quad (15)$$

where $\theta_0$ is a possible offset angle representing the mechanical position when the counter value is zero. The corresponding angular speed is $$\Omega_n = \frac{\Delta\theta_n}{\Delta t_n} \quad (16)$$

where $\Delta\theta_n$ and $\Delta t_n$ are the angle and time increments, respectively.

Harmonic speed variations may be found from Fourier analysis of the estimated speed. Since the cogging torque is dominated by a few harmonics, it is convenient to use a direct analysis method represented by the complex summations below $$\Omega_h = \frac{2\sum_n \Omega_n \exp(-jhn_s\theta_n)\Delta\theta_n}{\sum_n \Delta\theta_n} \quad (17)$$

The summation index must run over samples that cover an integer number of slot periods to give correct amplitudes, that is, $$n_s \sum_n \Delta\theta_n = m \cdot 2\pi \quad (18)$$

where m is an integer. The formula (16) applies both when the sampling time interval is constant and when the angle increments are constant. The latter method is often preferable of the following reasons:

Speed accuracy is better, provided that the time resolution of the logging device is higher than the encoder based angular resolution.

It is comparatively easy to find number of elements that correspond to an exact integer number of slot periods.

The summation formula above simplifies substantially when the angle increments $\Delta\theta_n$ are constant.

Correction for anharmonic speed variations is easier, as explained below.

Anharmonic speed variations here mean slow speed variations that do not originate from cogging. Common sources are variations in the operator set speed and in the motor load. These variations can give false Fourier components that do not originate for cogging torque. As an example, if the speed increases linearly with a constant acceleration, the Fourier analysis interprets this as a periodic saw tooth shaped signal that has a plurality of harmonics.

Therefore, in order to minimize the effect of anharmonic variations, the speed signal should be removed before the Fourier analysis is applied. One possible way to do this is to fit a low order polynomial to the raw speed data. This approach has at least two disadvantages:

It is time and capacity consuming.

The fit can remove also parts of the true harmonic variations. This is realized by studying a simple example of a pure sine signal: $\Omega = \sin(n_s\theta)$. Linear regression of this function will give a sloped curve removing also a part of the sine component.

A preferred way of removing anharmonic speed variations is explained below.

Use a relatively large analysis window representing a multiple of $m_a$ slot periods, where $m_a$ is typically 2 or 3.

Find individual averages for each subset of the raw speed data. Since the averages coves an integer number of cogging periods they are unaffected by the cogging induced variations.

Find a fit polynomial of degree $m_a-1$ that fits this data set of averages.

Subtract the fit function from the original raw speed data to obtain a dynamic signal without harmful anharmonic variations.

The accuracy of the speed amplitude estimates, and thereby also the desired cogging compensation amplitudes, depends on many factors but especially the number of cogging periods included in the analysis. An alternative to increasing the number of periods m is to average over more than one tests.

There are many ways to do averaging. A preferred way is to use running average with equal weight from all previous tests:

$$\overline{C}_{o,k+1} = \frac{1}{1+k}C_o + \frac{k}{1+k}\overline{C}_{o,k} \quad (19)$$

Where $\overline{C}_{o,k}$ is the average after k tuning tests. Note that the very first trial amplitude, $C_b$, which can be associated with $\overline{C}_{o,0}$, will not have any influence on the subsequent averages.

To check convergence in repeated tests, it is also useful to construct similar averages for the speed amplitudes:

$$\overline{\Omega}_{a,k+1} = \frac{1}{1+k}\Omega_a + \frac{k}{1+k}\overline{\Omega}_{a,k} \quad (20)$$

The following algorithm describes one of many possible ways to implement adaptive cogging compensation including a plurality of cogging harmonics represented by $\{h\}$ a. Monitor mean speed and load and wait for steady state conditions until the rate of changes are sufficiently small.

b. If no tests have been performed for this load and speed combination, then set test counter to k=0 and the best guess for the desired compensation amplitudes equal to $\{\overline{C}_h\}_{o,0}$.

c. Select reference conditions with zero compensation amplitudes, represented by the set of harmonics complex amplitudes $\{C_h\}_a=\{0\}$ and transfer them to the drive.

d. Wait a specified transient time interval, typically 0.2 s, needed to produce steady state speed variations with the new compensation values.

e. Capture a record of angle and time increment values represented by $\{\theta_n,\Delta t_n\}_a$, covering an integer number of cogging periods.

f. Select a set of cogging compensation amplitudes $\{C_h\}_b=\{\overline{C}_h\}_{o,k}$ representing the best estimate for the desired compensation.

g. Capture another record of angle and time increment values represented by $\{\theta_n,\Delta t_n\}_b$ h. Process the two data records separately by:
    producing speed records
    removing anharmonic speed variations
    applying Fourier analysis to find speed amplitudes $\{\Omega_h\}_a$ and $\{\Omega_h\}_b$.

i. Calculate new estimates for the desired compensation amplitudes $\{C_h\}_o$ by equation (11),
    update averaged amplitudes by equation (18),
    update the speed amplitudes for the sub tests a and b by means of equation (19) and
    increment test counter by one.
    calculate residual compensation errors by $\epsilon_h=|\overline{\Omega}_{h,o}/\overline{\Omega}_{h,a}|$ j. Repeat test sequence a.-i. until compensation is good enough, typically $\epsilon_1<0.1$, or until maximum test number is reached, typically $k_{max}=10$ k. Send last cogging compensation amplitudes $\{\overline{C}_h\}_{o,k}$ to the drive and keep this value until new tuning is required for a different speed and load condition.

If the desired cogging amplitudes do not vary with time or temperature, adaptive cogging compensation may preferably be run during a start-up phase to find, once for all, how amplitudes vary with speed and load. When the cogging amplitudes have been accurately mapped over the entire working range of the motor, further testing can be skipped in future operations. The benefits of this procedure are obvious:

The drive itself or a PLC controlling the drive can be programmed to give the correct compensation amplitudes for any combination of load and speed.

The hardware and software needed for running and analyzing the tuning tests can be removed.

Desired compensation is obtained continuously and the zero compensation reference tests with the associated temporary vibrations are avoided.

Compensation will work equally well during steady state conditions as under transient conditions when the speed and/or the load change rapidly.

There are several options for mapping the cogging compensations as a function of speed and load. The first one is to use empirical and analytical models with a relatively low number of fit parameters to achieve a good match between the measurements and the model. This approach is attractive if the amplitudes change moderately and smoothly as a function of speed and load.

A second option is to store the measurements in look-up tables representing grid points in the speed-load plane. If the table grid is course with a few points in each direction, it may be necessary to use a kind of interpolation for conditions between the table points.

An alternative to using interpolation from a course table is to use a fine meshed grid. The filling of grid points can be done either directly requiring a large number of tuning tests, or it can be done indirectly. The latter option means that the cogging amplitude is first measured in a primary course mesh over the entire working area of the motor. Then the final table is generated by interpolation from the primary table. Such tables, consisting of either one complex table or two real tables per cogging harmonics, will be a kind of "fingerprint" for a motor.

The proposed method requires only one single encoder signal for both the angle and speed measurements. No other sensors such as for instant torque or for angular acceleration are needed.

It does not require a priori knowledge of how the cogging torque varies with angular position, speed and load of the motor.

It does neither require detailed knowledge of the characteristics or the speed controller nor of the torque controller of the drive.

On the drawings the reference numeral 1 denotes a permanent magnet machine in the form of a motor that is coupled to a crane wire spool 2 through a gear 4. The motor 1 in this embodiment is a radial flux permanent magnet motor with outer rotor, 12 pole pairs and 72 stator slots. Rated power is 375 kW while nominal speed is 80 rpm, corresponding to an electric frequency of 16 Hz. Maximum speed with field weakening is 210 rpm.

A sensor 6 in the form of an incremental encoder is connected to the motor 1. The encoder gives 120000 pulses per revolution, and is used both for rotor angle measurement and rotation speed measurement. The encoder 6 also gives an index pulse that is used for resetting the position counter every completed revolution.

The motor 1 is connected to a variable frequency drive 8 via a cable 10. A suitable drive 8 is a drive with 3 sine generators for torque harmonics, as produced by Siemens AG. The drive 8 is designed to generate the compensation signal based on specified values of harmonics number, amplitude and phase.

A Programmable Automation Controller 12 (PAC) is connected to the encoder 6 via a cable 14 and programmed to read the signals from the encoder 6 directly. The PAC communicates with the drive 8 via a Programmable Logic Controller 16 (PLC). A Compact RIO Programmable Automation Controller from National Instruments is well suited for the purpose.

A preferred step-by-step algorithm includes:

I. Prepare the drive 8 by setting the harmonics numbers for cogging compensation to 6 and 12, which represent the $6^{th}$ and $12^{th}$ harmonics of the electric frequency and the $1^{st}$ and $2^{nd}$ cogging harmonics, respectively.

Figure 3:
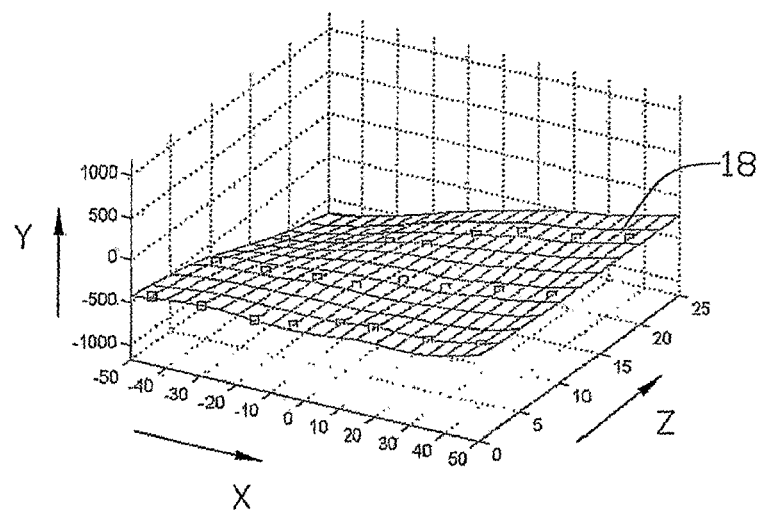
FIG. 3 shows a graph representing the real part of the cogging compensation torque as a function of motor speed and torque where the X-axis represents the speed in rpm, the Y-axis represents the real part of the cogging compensation torque C in Nm and the Z-axis represent the torque in kNm.
Figure 4:
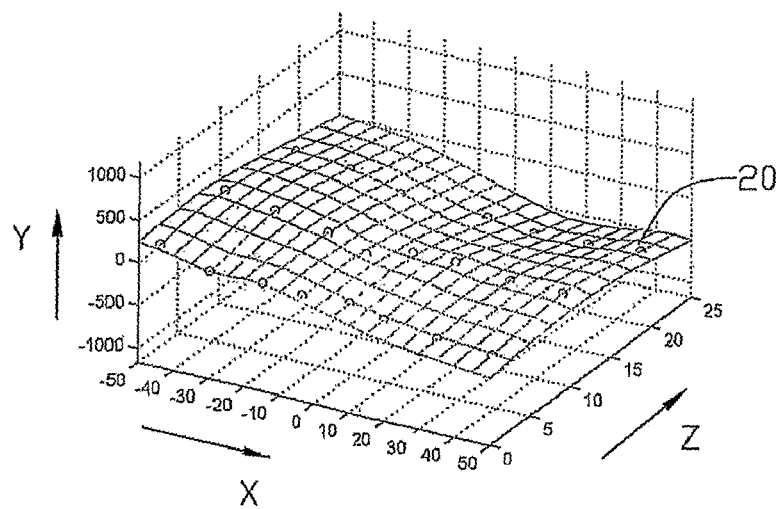
FIG. 4 shows a graph representing the imaginary part of the cogging compensation torque as a function of motor speed and torque where the X-axis represents the speed in rpm, the Y-axis represents the imaginary part of the cogging compensation torque C in Nm and the Z-axis represent the torque in kNm.

II. Also prepare a test condition matrix representing a few loads, typically 10, 50 and 90% of rated load, and a few more speeds, typically ±5, ±15, ±30 and ±45 rpm. Also reset the number completed tests k for all points in the test matrix and put a best guess for the cogging compensation amplitudes into the resulting cogging amplitude matrix. An example of the real and imaginary parts of said matrix is shown in FIGS. 3 and 4.

III. Select a new combination of load and speed and run the motor at that condition.

IV. Start subtest a by sending zero compensation amplitudes to the drive. Set corresponding compensation amplitudes $C_{1a}=0$ and $C_{2a}=0$ V. Wait 0.5 s for the cogging vibrations to become stable.

VI. Let the external processor capture a file of 5000 constant increasing or decreasing count numbers and corresponding time increments, thus representing three or a multiple of three cogging periods.

VII. Convert this raw data to a set of 5000 angular positions and rotation speeds.

VIII. Remove possible anharmonic speed variation by the method described above. Use a $2^{nd}$ order polynomial fit based on the three averages represented by the sub-arrays 1 to 1667, 1667 to 3333 and 3333 to 5000.

IX. Apply equation (17) for each of the two lowest harmonics, to find the complex speed amplitudes, $\Omega_{1a}$ and $\Omega_{2a}$ for test a. This completes the subtest a.

X. Start subtest b by selecting the best estimates for compensation amplitudes: $C_{1b}=\overline{C}_{1o,k}$ and $C_{2b}=\overline{C}_{2o,k}$ XI. Repeat steps V to VIII for subtest b.

XII. Apply equation (17) for each of the two lowest harmonics, to find the complex speed amplitudes, $\Omega_{1b}$ and $\Omega_{1b}$ for subtest b.

XIII. Apply equation (11) for calculating desired compensation amplitudes for the harmonics 1 and 2: $C_{1o}$, and $C_{2o}$.

XIV. Apply equations (19) and (20) for updating smoothed values for the compensation amplitudes and speed amplitudes. Increment test counter k for this load combination by 1.

XV. Check convergence and repeat steps IV-XIV until the residual first harmonic speed amplitude $|\Omega_{1o,k}|$ is sufficiently small, typically <0.001 rad/s, or until the maximum of typically 10 tests have been completed.

XVI. Repeat steps IV-XIV until all test conditions have been completed.

XVII. Generate a fine meshed grid covering all conditions for which cogging compensation is desired, for instance every integer rpm from −50 to 50 rpm, and every integer torque from 0 to 50 kNm. The measured a calculated points are set out as points 18 and 20 in FIGS. 3 and 4 respectively.

XVIII. Use a known mathematical method to generate a corresponding fine-meshed look-up tables as shown in FIGS. 3 and 4 for the $1^{st}$ and $2^{nd}$ harmonic compensation amplitudes. As an example, this can be achieved by the LabVIEW mathScript function 'griddata' using the method option 'v4'. Since this function accepts real values only, the real and imaginary parts must be found separately.

XIX. Transform the real part, see FIG. 3, and the imaginary part, see FIG. 4, of the look-up tables to corresponding tables of real magnitudes and phases and store them in the PLC controlling the drive.

XX. Run a program in the PLC that continuously monitors the speed and the load of the motor, and that picks the correct compensation magnitudes and phases and sends them to the drive.

XXI. This completes the tuning test procedure for this particular motor and drive combination, and the external processor is no longer needed for achieving a good cogging compensation.

Figure 2:
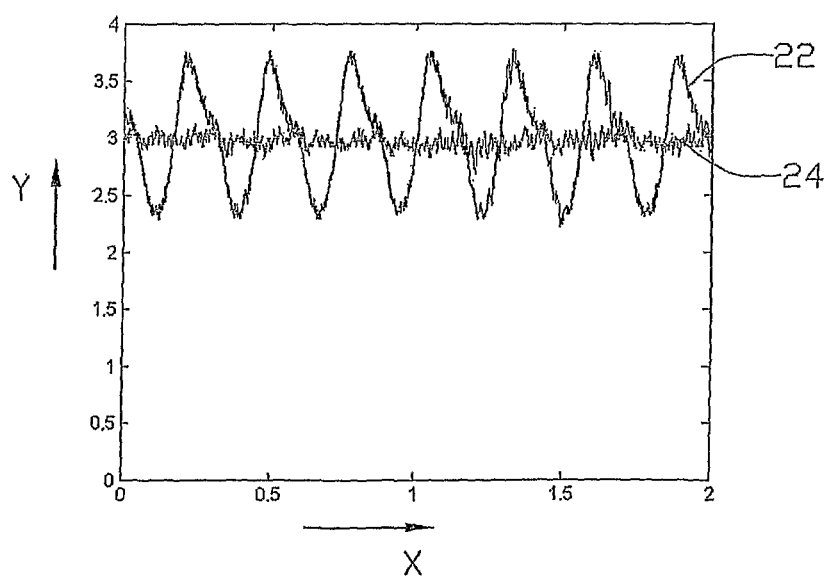
FIG. 2 shows measured motor speeds with and without cogging compensation where the X-axis represent time in seconds and the Y-axis represents the speed in rpm.

In FIG. 2 the speed of the motor 1 is shown where the curve 22 shows the motor speed without cogging compensation and the curve 24 shows the motor speed with cogging compensation according to the present document.

The invention claimed is:

1. A method for reducing cogging torque effects of an electrical permanent magnet machine where the machine is connected to a drive, and where the drive includes a feature of adding a torque component independent of a torque generated by a speed regulator, the machine having a rotor and a stator, the method comprising:
   measuring an angular position of the rotor relative to the stator and an angular speed of the rotor by use of a sensor;
   running at least two tests with at least two different cogging compensation signals from the drive where one of the tests is designated an "a" test and another of the tests is designated a "b" test;
   analyzing a received signal from the sensor to find corresponding amplitude and phase responses of a vibration signal for said tests;
   calculating a first value by multiplying a complex cogging amplitude of the compensation signal applied for the "a" test with a complex amplitude of the vibration signal representing vibrations resulting from cogging torque of the "b" test;
   calculating a second value by multiplying a complex cogging amplitude of the compensation signal applied for the "b" test with a complex amplitude of the vibration signal representing vibrations resulting from cogging torque of the "a" test;
   calculating a desired complex cogging compensation amplitude by dividing the difference between said first value and said second value by a difference between the complex amplitudes of the vibration signals representing vibrations resulting from the "b" test and the "a" test; and
   applying a cogging compensation torque to the machine based on the desired complex cogging compensation amplitude.

2. The method of claim 1, further comprising measuring at least one of the quantities: angular speed or angular acceleration of the rotor, the stator or the difference between the two, by the use of a vibration sensor attached to the machine or its foundation.

3. The method of claim 1, further comprising running the tests with two different compensation signals where one or more harmonics of a fundamental cogging frequency are added to a set torque from the speed regulator.

4. The method of claim 1, further comprising applying a position or time based Fourier analysis of a raw or processed speed signal in order to find corresponding amplitude and phase responses of the speed for said tests.

5. The method of claim 1, wherein a processed speed signal is corrected for anharmonic variations through:
   calculating partial averages of speed and angle over intervals representing an integer number of cogging periods
   fitting a polynomial function to said averages
   subtracting the fitted function from a raw speed signal rendering a dynamic speed signal more suitable for Fourier analysis.

6. A system, comprising:
   an electrical permanent magnet machine including a rotor and a stator;
   a drive coupled to the machine;
   a sensor configured to generate a vibration signal representing vibrations resulting from cogging torque;
   a processor coupled to the drive, the machine, and the sensor;
   wherein the processor is configured to:
      run at least two tests of the machine with at least two different cogging compensation signals from the drive, one of the tests being designated an "a" test and another of the tests being designated a "b" test;
      determine the amplitude and phase responses of the signal for each of the tests;
      multiply a complex cogging amplitude of the cogging compensation signal applied during the "a" test with a complex amplitude of the vibration signal generated during the "b" test to compute a first value;
      multiply a complex cogging amplitude of the cogging compensation signal applied during the "b" test with a complex amplitude of the vibration signal generated during the "a" test to compute a second value;
      divide a difference between the first value and the second value by a difference between the complex amplitudes of the vibration signals generated during the "b" test and the "a" test to compute a desired complex cogging amplitude; and
      apply a cogging compensation torque to the machine based on the desired complex cogging compensation amplitude.

7. The system of claim 6, wherein the sensor is an encoder configured to measure the angular position of the rotor relative to the stator.

8. The system of claim 6, wherein the sensor is a vibration sensor attached to the machine or its foundation.

9. The system of claim 6, wherein:
   the drive is configured to add a torque component independent of a torque generated by a speed regulator; and
   the processor is further configured to run the tests with two different compensation signals where one or more harmonics of the fundamental cogging frequency are added to the torque generated by the speed regulator.

10. The system of claim 6, wherein the processor is further configured to:
   measure the angular speed of the rotor, the measurements comprising a raw speed signal; and
   compute a processed speed signal from the raw speed signal by correcting the raw speed signal for anharmonic speed variations.

11. The system of claim 10, wherein correcting for anaharmonic speed variations comprises:

calculating partial averages of speed and angle over intervals representing an integer number of the cogging periods;

fitting a polynomial function to the said averages; and subtracting the fitted function from the raw speed signal rendering a dynamic speed signal more suitable for Fourier analysis.

12. The system of claim 10, wherein the processor is further configured to apply a position or time based Fourier analysis to the raw speed signal or the processed speed signal in order to find the corresponding amplitude and phase responses of the speed for said tests.

13. An apparatus, comprising:

an electrical permanent magnet machine;

a drive configured to control the speed of the machine;

a controller coupled to the drive, the controller configured to monitor the speed and load of the machine, and to provide cogging compensation values to the drive, each cogging compensation value being based on:

a quotient of a difference of a product of a complex cogging amplitude of a compensation signal applied during a first test of the machine with a complex amplitude of a vibration signal measured during a second test of the machine and a product of a complex cogging amplitude of a compensation signal applied during the second test with a complex amplitude of a vibration signal measured during the first test; and a difference of the complex amplitudes of the vibration signals measured during the second test and the first test.

14. The apparatus of claim 13, further comprising:

a look-up table stored in the controller;

wherein the look-up table includes the cogging compensation values; and wherein each cogging compensation value comprises a cogging compensation amplitude value and phase value based on different instances of the first test and the second test.

15. The apparatus of claim 13, wherein the cogging compensation values are further based on application of Fourier analysis to speed data acquired during the first and second tests.

16. The apparatus of claim 13, wherein the cogging compensation values are further based on speed data acquired during the first and second tests processed to remove anaharmonic speed variations from the speed data.

17. The apparatus of claim 13, further comprising a sensor coupled to the machine, the sensor configured to provide machine position and speed information, wherein the vibration signals are based on the information provided by the sensor.

* * * * *

UNITED STATES PATENT AND TRADEMARK OFFICE
CERTIFICATE OF CORRECTION

PATENT NO.        : 8,541,968 B2                                              Page 1 of 1
APPLICATION NO.   : 12/934182
DATED             : September 24, 2013
INVENTOR(S)       : \Age Kyllingstad It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 530 days.

Signed and Sealed this

Fifteenth Day of September, 2015

Michelle K. Lee
*Director of the United States Patent and Trademark Office*